United States Patent
Enya

(10) Patent No.: US 12,422,715 B2
(45) Date of Patent: Sep. 23, 2025

(54) LIGHT CONTROL SHEET, LIGHT CONTROL DEVICE, PHOTOSENSITIVE COMPOSITION, AND METHOD FOR PRODUCING LIGHT CONTROL SHEET

(71) Applicant: TOPPAN Inc., Tokyo (JP)

(72) Inventor: Taisuke Enya, Taito-ku (JP)

(73) Assignee: TOPPAN Inc., Taito-ku (JP)

( * ) Notice: Subject to any disclaimer, the term of this patent is extended or adjusted under 35 U.S.C. 154(b) by 0 days.

(21) Appl. No.: 18/476,440

(22) Filed: Sep. 28, 2023

(65) Prior Publication Data

US 2024/0027836 A1 Jan. 25, 2024

Related U.S. Application Data

(63) Continuation of application No. PCT/JP2022/016755, filed on Mar. 31, 2022.

(30) Foreign Application Priority Data

Mar. 31, 2021 (JP) ................... 2021-060925

(51) Int. Cl.
| | | |
|---|---|---|
| G02F 1/1333 | (2006.01) | |
| C09K 19/02 | (2006.01) | |
| C09K 19/38 | (2006.01) | |
| G02F 1/00 | (2006.01) | |
| G02F 1/1337 | (2006.01) | |

(52) U.S. Cl.
CPC ........ *G02F 1/133711* (2013.01); *C09K 19/02* (2013.01); *C09K 19/3838* (2013.01); *G02F 1/0063* (2013.01); *C09K 2219/03* (2013.01)

(58) Field of Classification Search
CPC ................. G02F 1/1333; G02F 1/1334; G02F 1/133711; C09K 19/02; C09K 19/3838
See application file for complete search history.

(56) References Cited

U.S. PATENT DOCUMENTS

| | | |
|---|---|---|
| 5,450,220 A | 9/1995 | Onishi et al. |
| 5,583,673 A | 12/1996 | Onishi et al. |
| 5,608,555 A | 3/1997 | Onishi et al. |
| 5,620,630 A | 4/1997 | Onishi et al. |
| 5,856,432 A | 1/1999 | Auman et al. |
| 2019/0127642 A1 | 5/2019 | Adlem et al. |
| 2019/0292461 A1 | 9/2019 | Matsuda et al. |
| 2021/0261864 A1 | 8/2021 | Tanabe et al. |
| 2024/0027836 A1* | 1/2024 | Enya .............. C09K 19/02 |
| 2024/0353704 A1* | 10/2024 | Oonuma ............ G02F 1/13 |

FOREIGN PATENT DOCUMENTS

| | | |
|---|---|---|
| CN | 105418854 A | 3/2016 |
| JP | H02-278230 A | 11/1990 |
| JP | H05-188355 A | 7/1993 |
| JP | H06-194633 A | 7/1994 |
| JP | H06-194636 A | 7/1994 |
| JP | H07-056147 A | 3/1995 |
| JP | H08-060158 A | 3/1996 |
| JP | 2002-003844 A | 1/2002 |
| JP | 2002-293827 A | 10/2002 |
| JP | 2008-292571 A | 12/2008 |
| JP | 2017-187775 A | 10/2017 |
| JP | 2019-515989 A | 6/2019 |
| WO | WO 2018/025996 A1 | 2/2018 |
| WO | WO 2018/105312 A1 | 6/2018 |

OTHER PUBLICATIONS

International Search Report issued Jun. 21, 2022 in PCT/JP2022/016755 filed Mar. 31, 2022, 7 pages.
Office Action issued Sep. 1, 2021 in relevant Japanese Patent Application No. 2021-060925, (with English-language Translation), 8 pages.
Office Action issued Aug. 15, 2023 in relevant Japanese Patent Application No. 2022-105420, (with English-language Translation), 11 pages.
Third Party Observation issued Jun. 27, 2025 in European Patent Application No. 22781279.9.

* cited by examiner

*Primary Examiner* — Geraldina Visconti
(74) *Attorney, Agent, or Firm* — Oblon, McClelland, Maier &Neustadt, L.L.P.

(57) ABSTRACT

A light control layer contains a liquid crystal composition and a resin composition. The liquid crystal composition is composed of a liquid crystal compound having a nematic-isotropic phase transition temperature of 110° C. or greater and 140° C. or less, the resin composition contains an acrylic polymer, a bridging group of the acrylic polymer is a saturated alkyl group having 1 or more and 12 or fewer carbon atoms, and the resin composition contains, in the acrylic polymer, a moiety in which the saturated alkyl group is a linear alkyl group, whereby a light control device operates normally over a wider temperature range.

20 Claims, 4 Drawing Sheets

FIG.5

| OPAQUE | TRANSPARENT | CHARACTER CLARITY | PHOTOGRAPH |
|---|---|---|---|
| | GOOD - EXCELLENT | TRANSPARENT | |
| | FAIR | CHARACTERS CLEAR | |
| POOR | | 50%-100% OF CHARACTERS LEGIBLE | |
| | | 0%-50% OF CHARACTERS LEGIBLE | |
| | POOR | OUTLINE OF CHARACTERS IDENTIFIABLE | |
| | GOOD - EXCELLENT | OPAQUE | |

LEVEL: 0, 1, 2, 3, 4, 5

FIG.6

| | | | Example | | | | | | | | | | | | Comparative Example | | | |
|---|---|---|---|---|---|---|---|---|---|---|---|---|---|---|---|---|---|---|
| | | 1 | 2 | 3 | 4 | 5 | 6 | 7 | 8 | 9 | 10 | 11 | 12 | 1 | 2 | 3 | 4 |
| Liquid crystal | Nematic-isotropic phase transition temperature (NI) | 110 | 110 | 110 | | | 125 | 125 | | | | 140 | 140 | 100 | | 150 | 110 |
| Content of photopolymerizable compound | Isobornyl acrylate | 16% | 0% | 18% | 0% | 16% | 0% | 18% | 0% | 16% | 0% | 0% | 18% | 0% | 0% | 18% | 0% |
| | Methyl acrylate | 0% | 16% | 11% | 0% | 0% | 16% | 0% | 16% | 0% | 0% | 11% | 0% | 0% | 0% | 11% | 0% |
| | Dodecyl acrylate | 0% | 0% | 0% | 11% | 16% | 0% | 11% | 11% | 16% | 16% | 0% | 11% | 11% | 0% | 0% | 0% |
| | Hexadecyl acrylate | | | | | | | 50% | | | | | | | 0% | | | 16% |
| | Pentaerythritol triacrylate | 11% | 6% | 6% | 6% | 11% | 11% | 6% | 6% | 11% | 11% | 6% | 6% | 15% | | 6% | 11% |
| | Urethane acrylate | 21% | 21% | 13% | 13% | 21% | 13% | 13% | 13% | 21% | 21% | 13% | 13% | 33% | | 13% | 21% |
| State of photosensitive composition before curing | | TRANSPARENT | | | | | | | | | | | | TURBID | TURBID | TRANSPARENT | TURBID |
| Optical characteristics | Opaque Haze (Excellent: ≥97%, Good: 90-97%, Fair: 85-90%, Poor: <85%) | GOOD | GOOD | GOOD | GOOD | GOOD | GOOD | GOOD | GOOD | GOOD | GOOD | EXCELLENT | EXCELLENT | EXCELLENT | UNUSABLE | EXCELLENT | UNUSABLE |
| | | GOOD | GOOD | EXCELLENT | GOOD | GOOD | GOOD | EXCELLENT | EXCELLENT | GOOD | GOOD | EXCELLENT | EXCELLENT | EXCELLENT | | EXCELLENT | |
| | | GOOD | GOOD | EXCELLENT | GOOD | GOOD | GOOD | EXCELLENT | EXCELLENT | GOOD | GOOD | EXCELLENT | EXCELLENT | EXCELLENT | | EXCELLENT | |
| | | GOOD | GOOD | EXCELLENT | GOOD | GOOD | GOOD | EXCELLENT | EXCELLENT | GOOD | GOOD | EXCELLENT | EXCELLENT | EXCELLENT | | EXCELLENT | |
| | | FAIR | FAIR | GOOD | GOOD | FAIR | FAIR | GOOD | GOOD | FAIR | FAIR | GOOD | GOOD | FAIR | | GOOD | |
| | | FAIR | FAIR | GOOD | GOOD | FAIR | FAIR | GOOD | GOOD | FAIR | FAIR | GOOD | GOOD | FAIR | | GOOD | |
| | Transparent Haze (Excellent: ≤5.0%, Good: 5.0-5.5%, Fair: 5.5-6.0%, Poor: >6.0%) | GOOD | GOOD | GOOD | GOOD | GOOD | GOOD | GOOD | GOOD | GOOD | GOOD | EXCELLENT | EXCELLENT | EXCELLENT | | EXCELLENT | |
| | | GOOD | GOOD | GOOD | GOOD | GOOD | GOOD | GOOD | GOOD | GOOD | GOOD | FAIR | FAIR | FAIR | | POOR | |
| | | GOOD | GOOD | GOOD | GOOD | GOOD | GOOD | GOOD | GOOD | GOOD | GOOD | FAIR | FAIR | FAIR | | POOR | |
| | | GOOD | GOOD | GOOD | GOOD | GOOD | GOOD | GOOD | GOOD | GOOD | GOOD | GOOD | GOOD | FAIR | | EXCELLENT | |
| | | GOOD | GOOD | GOOD | GOOD | GOOD | GOOD | GOOD | GOOD | GOOD | GOOD | GOOD | GOOD | GOOD | | EXCELLENT | |
| | | GOOD | GOOD | GOOD | GOOD | GOOD | GOOD | GOOD | GOOD | GOOD | GOOD | GOOD | GOOD | POOR | | EXCELLENT | |

Temperature column: −30°C, −20°C, 0°C, 23°C, 90°C, 100°C (Opaque); −30°C, −20°C, 0°C, 23°C, 90°C, 100°C (Transparent)

LIGHT CONTROL SHEET, LIGHT CONTROL DEVICE, PHOTOSENSITIVE COMPOSITION, AND METHOD FOR PRODUCING LIGHT CONTROL SHEET

CROSS-REFERENCE TO RELATED APPLICATIONS

The present application is a continuation of and claims the benefit of priority to International Application No. PCT/JP2022/016755, filed Mar. 31, 2022 which is based upon and claims the benefit of priority to Japanese Application No. 2021-060925, filed Mar. 31, 2021. The entire contents of these applications are incorporated herein by reference.

BACKGROUND OF THE INVENTION

Field of the Invention

The present invention relates to a light control sheet, a light control device, a photosensitive composition, and a method for producing the light control sheet.

Description of Background Art

For example, JP 2017-187775 A describes a light control sheet that includes a light control layer containing a resin composition and a liquid crystal composition, and a pair of transparent electrode layers that sandwich the light control layer. The entire contents of this publication are incorporated herein by reference.

SUMMARY OF THE INVENTION

According to one aspect of the present invention, a liquid crystal-dispersed light control sheet includes a light control layer, a pair of transparent electrode layers sandwiching the light control layer, and a pair of transparent support layers sandwiching the pair of transparent electrode layers. The light control layer includes a resin composition partitioning voids, and a liquid crystal composition filling the voids, the liquid crystal composition includes a liquid crystal compound having a nematic-isotropic phase transition temperature in a range of 110° C. to 140° C., and the resin composition includes an acrylic polymer including a repeating structure of formula (1),

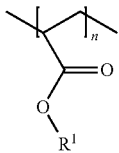

(1)

where $R^1$ is a saturated alkyl group having 1 or more and 12 or fewer carbon atoms such that the acrylic polymer includes a moiety in which the saturated alkyl group is a linear alkyl group.

According to another aspect of the present invention, a photosensitive composition for producing a liquid crystal-dispersed light control layer includes an acrylate mixture, and a liquid crystal composition. The liquid crystal composition includes a liquid crystal compound having a nematic-isotropic phase transition temperature in a range of 110° C. to 140° C., the acrylate mixture includes pentaerythritol triacrylate, urethane acrylate, and an acrylate of formula (2), $$CH_2CHCOO-R^2 \qquad (2)$$

where $R^2$ is a saturated alkyl group having 1 or more and 12 or fewer carbon atoms such that the acrylate mixture includes an acrylate in which the saturated alkyl group is a linear alkyl group and an acrylate in which the saturated alkyl group is a bicycloalkyl group.

According to yet another aspect of the present invention, a method for producing a liquid crystal-dispersed light control sheet includes applying a photosensitive composition including an acrylate mixture and a liquid crystal composition to a transparent support layer of a laminate including a transparent electrode layer and the transparent support layer, and applying light of a specific wavelength to the laminate coated with the photosensitive composition and another laminate that are superimposed such that the photosensitive composition is formed between the laminates to cure the acrylate mixture. The liquid crystal composition includes a liquid crystal compound having a nematic-isotropic phase transition temperature in a range of 110° C. to 140° C., and the acrylate mixture includes pentaerythritol triacrylate, urethane acrylate, and an acrylate of formula (2), $$CH_2CHCOO-R^2 \qquad (2)$$

where $R^2$ is a saturated alkyl group having 1 or more and 12 or fewer carbon atoms such that the acrylate mixture includes an acrylate in which the saturated alkyl group is a linear alkyl group and an acrylate in which the saturated alkyl group is a bicycloalkyl group.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 5 is a table for evaluating the opaque and transparent states of the light control sheets of the examples and comparative examples; and FIG. 6 is a table showing the evaluation results of the light control sheets of the examples and comparative examples.

DETAILED DESCRIPTION OF THE EMBODIMENTS

Figure 1:
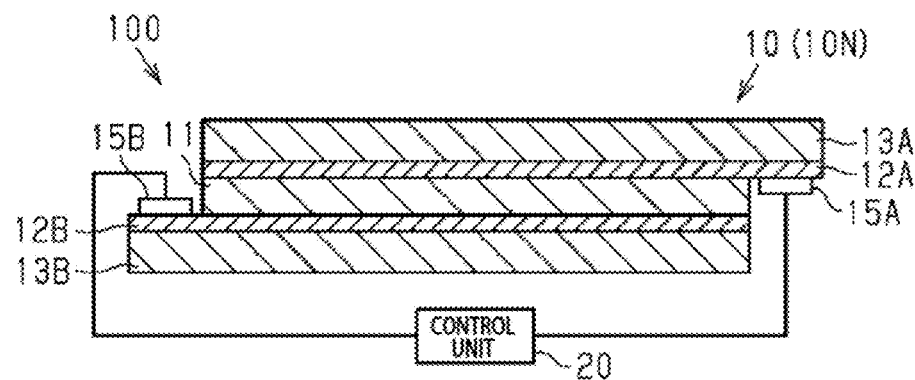
FIG. 1 is a diagram illustrating the configuration of a light control device using a light control sheet, mainly a cross-sectional structure of a normal-type light control sheet.

Embodiments will now be described with reference to the accompanying drawings, wherein like reference numerals designate corresponding or identical elements throughout the various drawings.

Referring to the drawings, a light control sheet, a light control device, a photosensitive composition, and a method for producing the light control sheet according to embodiments of the present invention will be described.

Basic Structure of Light Control Device Referring to FIG. 1, the basic structures of the light control sheet and light control device will be described.

The light control device 100 includes a light control sheet 10, and a control unit 20 that controls application of a drive voltage to the light control sheet 10. The light control sheet 10 may have a structure of a normal-type light control sheet 10N, or a structure of a reverse-type light control sheet 10R. FIG. 1 shows a cross-sectional structure of a normal-type light control sheet 10N. The configuration common to the normal-type light control sheet 10N and the reverse-type light control sheet 10R will be described as the configuration of the light control sheet 10.

The normal-type light control sheet 10N includes a light control layer 11, a first transparent electrode layer 12A, a second transparent electrode layer 12B, a first transparent support layer 13A, and a second transparent support layer 13B. The first transparent electrode layer 12A and the second transparent electrode layer 12B sandwich the light control layer 11. The first transparent support layer 13A and the second transparent support layer 13B sandwich the light control layer 11, and also sandwich the two transparent electrode layers 12A and 12B. The first transparent support layer 13A supports the first transparent electrode layer 12A. The second transparent support layer 13B supports the second transparent electrode layer 12B.

One corner of the surface of the light control sheet 10N is a region where the first transparent electrode layer 12A is exposed. A first terminal unit 15A is connected to this region. The first terminal unit 15A is connected to the control unit 20 through a wire. Further, another corner of the surface of the light control sheet 10N is a region where the second transparent electrode layer 12B is exposed. A second terminal unit 15B is connected to this region. The second terminal unit 15B is connected to the control unit 20 through a wire. The first terminal unit 15A and the second terminal unit 15B constitute the light control sheet 10N.

The control unit 20 generates a drive voltage, which is an AC voltage, and applies the drive voltage between the first transparent electrode layer 12A and the second transparent electrode layer 12B.

The light control sheet 10 includes a liquid crystal-dispersed light control layer 11. The light control layer 11 contains a resin composition and a liquid crystal composition. An example of the light control layer 11 is a polymer dispersed liquid crystal (PDLC). In the polymer dispersed liquid crystal, domains, which are multiple voids, are dispersed in a resin composition containing a polymer compound. The liquid crystal composition containing the liquid crystal compound fills the domains. The light control layer 11 may be a polymer network liquid crystal (PNLC), a nematic curvilinear aligned phase (NCAP), or a combined structure thereof. The polymer network liquid crystal has a three-dimensional mesh polymer network, and holds a liquid crystal compound, which is an example of oriented particles, in voids in the polymer network. The nematic curvilinear aligned phase holds an encapsulated liquid crystal composition in a resin composition.

Next, the material constituting each layer will be described.

Each of the first transparent electrode layer 12A and the second transparent electrode layer 12B is a conductive transparent layer. The material constituting the transparent electrode layers 12A and 12B may be, for example, a polymer containing indium tin oxide (ITO), fluorine-doped tin oxide (FTO), tin oxide, zinc oxide, carbon nanotubes (CNT), or poly(3,4-ethylenedioxythiophene) (PEDOT), or a multilayer film including an Ag alloy thin film.

Each of the first transparent support layer 13A and the second transparent support layer 13B is a transparent substrate. The transparent support layers 13A and 13B may be, for example, glass substrates or polymer films composed of one polymer compound selected from a group of polyethylene, polystyrene, polyethylene terephthalate, polyvinyl alcohol, polycarbonate, polyvinyl chloride, polyimide, polysulfone, cycloolefin polymer, and triacetyl cellulose.

Each of the first terminal unit 15A and the second terminal unit 15B may be composed of, for example, a conductive adhesive layer such as a metal tape, a conductive film, or a conductive paste, and a wire substrate such as FPC, or a wire such as a lead wire.

The light control layer 11 contains a resin composition that partitions voids, and a liquid crystal composition filled in the voids. The main component of the liquid crystal composition is a liquid crystal compound. The nematic-isotropic phase transition temperature of the liquid crystal compound is 110° C. or greater and 140° C. or less. The liquid crystal compound may be a single compound or a mixture of two or more compounds. When the liquid crystal compound is a mixture, the nematic-isotropic phase transition temperature of all of the compounds constituting the liquid crystal compound may be 110° C. or greater and 140° C. or less, or the nematic-isotropic phase transition temperature of some of the compounds constituting the liquid crystal compound may be less than 110° C. and 140° C. or greater. The liquid crystal compound is at least one compound selected from a group of those based on phenyl-cyclohexyls, biphenylcyclohexanes, Schiff bases, azo types, azoxy types, biphenyls, terphenyls, benzoic acid esters, tolan types, pyrimidines, pyridazines, cyclohexanecarboxylic acid esters, dicyanobenzenes, naphthalenes, and dioxanes.

The phenyl-cyclohexane-based liquid crystal compound may be, for example, 4-(4'-n-propylcyclohexyl)-cyanobenzene or 4-(4'-n-pentylcyclohexyl)-cyanobenzene.

The liquid crystal compound constituting the liquid crystal composition may be a single compound alone or a mixture of several compounds. The liquid crystal composition may contain components other than the liquid crystal compound. Examples of such components other than the liquid crystal compound include viscosity-reducing agents, dichroic dyes, defoaming agents, antioxidants, and weathering agents, such as UV absorbers and light stabilizers. Because the liquid crystal compound constituting the liquid crystal composition is a mixture, the nematic-isotropic phase transition temperature of the liquid crystal compound can be easily adjusted.

The content (wt %) of the liquid crystal compound in the light control layer 11 is the ratio of the weight of the liquid crystal compound to the weight of the light control layer 11. The content of the liquid crystal compound in the light control layer 11 may be, for example, 30 wt % or more and 80 wt % or less and may be 50 wt % or more and 80 wt % or less. When it is necessary to increase the contrast, which is the difference between haze during transparent driving and haze during opaque driving in the light control sheet 10N, the content of the liquid crystal compound in the light control layer 11 is preferably 30 wt % or more, and more preferably 50 wt % or more. When it is necessary to increase the mechanical strength of the light control layer 11 and the adhesion strength with the transparent electrode layers, the content of the liquid crystal compound in the light control layer 11 is preferably 80 wt % or less, and more preferably 60 wt % or less.

The resin composition is a cured product among photosensitive compositions. The resin composition is a cured photosensitive compound polymerized by irradiation of light of a specific wavelength, such as ultraviolet light. The resin composition includes a repeating structure represented by the following formula (1). The repeating structure represented by the formula (1) is a structure that repeats repeating units. The repeating structure represented by the formula (1) includes an acrylate-derived repeating unit.

Chemical Formula 1

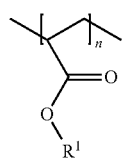

(1)

The bridging group represented by "$R^1$" is a saturated alkyl group having 1 or more and 12 or fewer carbon atoms. The resin composition contains a repeating structure wherein $R^1$ is a linear alkyl group. The resin composition may further contain a repeating structure wherein $R^1$ is a bicycloalkyl group. The degree of polymerization "n" is 2 or more and 500 or less. The resin compound constituting the resin composition may be a homopolymer formed from a single acrylate, a mixture of two or more homopolymers, or a copolymer formed from two or more acrylates. The homopolymer has a single repeating structure. The copolymer has two or more repeating structures. The resin composition may contain a homopolymer having a single repeating structure represented by the formula (1), or a copolymer having two or more repeating structures represented by the formula (1).

Hereinafter, among the resin compounds constituting the resin composition, the polymer wherein the bridging group $R^1$ is a linear alkyl group is referred to as the "first acrylic polymer". The first acrylic polymer may be a homopolymer or part of a copolymer. Further, among the polymers constituting the resin composition, the polymer wherein the bridging group $R^1$ is a cyclic alkyl group is referred to as the "second acrylic polymer". The second acrylic polymer is part of a copolymer.

The first acrylic polymer is an acrylate polymer. The acrylate for forming the first acrylic polymer is at least one photosensitive compound selected from a group of methyl acrylate, ethyl acrylate, propyl acrylate, butyl acrylate, pentyl acrylate, hexyl acrylate, heptyl acrylate, octyl acrylate, nonyl acrylate, decyl acrylate, undecyl acrylate, and dodecyl acrylate.

The second acrylic polymer is an acrylate polymer. The acrylate for forming the second acrylic polymer contains a cycloalkyl group, a bicycloalkyl group, or a tricycloalkyl group. The cycloalkyl group-containing acrylate is at least one photosensitive compound selected from a group of cyclopropyl acrylate, cyclobutyl acrylate, cyclopentyl acrylate, cyclohexyl acrylate, cycloheptanyl acrylate, cyclooctyl acrylate, cyclodecanyl acrylate, and cyclododecanyl acrylate. The bicycloalkyl group and tricycloalkyl group are polycyclic alkyl groups having a bridged structure in which two carbon atoms that constitute one ring structure are connected with a linear carbon chain. The polycyclic alkyl group may be a bicyclic functional group or a tricyclic functional group.

The bicycloalkyl group may contain an isobornyl group. The bicycloalkyl group-containing acrylate is at least one photosensitive compound selected from a group of isobornyl acrylate and bicyclo[3.2.1]octylacrylate. The tricycloalkyl group-containing acrylate is at least one photosensitive compound selected from a group of dicyclopentanyl acrylate and tricyclo[5.2.1.0$^{2,6}$]decane acrylate.

A liquid crystal compound having a nematic-isotropic phase transition temperature of 110° C. or greater and 140° C. or less has a structure that is longer in the major axis direction or has more ring structures compared with a liquid crystal compound having a lower transition temperature, and the compatibility between the liquid crystal compound and the acrylates is reduced. When the compatibility between the liquid crystal compound and the acrylates is reduced, the liquid crystal composition is difficult to disperse uniformly in the photosensitive composition for forming the light control layer 11. When it is necessary to increase the haze during opaque driving, the size of the voids in the resin composition is preferably 0.3 μm or more and 3 μm or less. The size of the voids in the resin composition is the diameter of circles circumscribed by the voids in a cross section including the thickness direction of the resin composition. The size of the voids in the resin composition is, for example, the average value of the diameters of all voids contained in a cross section having a size of 10 μm×10 μm. The more non-uniformly the liquid crystal composition is dispersed in the photosensitive composition, the more non-uniformly the positions of voids in the resin composition are distributed in the plane direction in which the light control layer 11 extends, and the voids tend to have various sizes. As a result, in the plane direction in which the light control layer 11 extends, the variation in the haze increases, or changes in the haze cannot be obtained; thus, the desired haze cannot be obtained during opaque driving. In contrast, since the acrylates for forming the first acrylic polymer and second acrylic polymer have a low molecular weight and contain a saturated alkyl group, which is a non-polar group, they are highly compatible with the liquid crystal compound, which has a high nematic-isotropic phase transition temperature.

When it is necessary to increase the compatibility between the liquid crystal compound and the acrylates, the content of the first acrylic polymer is 20 wt % or more and 90 wt % or less relative to the total solids content of the photosensitive composition. Further, the content of the first acrylic polymer may be 20 wt % or more and 40 wt % or less. When it is necessary to further increase the compatibility and facilitate the phase separation of the liquid crystal compound from the acrylate polymer, the resin composition preferably contains the first acrylic polymer and the second acrylic polymer. In this case, the sum of the content of the first acrylic polymer and the content of the second acrylic polymer is preferably 20 wt % or more and 90 wt % or less relative to the total solid content of the photosensitive composition. In addition, each of the content of the first acrylic polymer and the content of the second acrylic polymer may be 20 wt % or more and 40 wt % or less relative to the total solid content of the photosensitive composition.

Since the bicycloalkyl group has a bulkier structure than the linear alkyl group and the cycloalkyl group, repulsion caused by steric hindrance etc. occurs between the bicycloalkyl group-containing acrylate and the liquid crystal compound. As a result, at a temperature equal to or lower than the nematic-isotropic phase transition temperature, nematic phase domains formed by the liquid crystal compound are more likely to occur in the polymer, increasing the degree of phase separation. In particular, when increasing the compatibility between the linear alkyl group-containing acrylate and the liquid crystal compound, the content of the liquid crystal compound in the photosensitive composition increases; thus, phase separation may be difficult to progress. Because the photosensitive composition contains both an acrylate having a linear alkyl group and an acrylate having a bicycloalkyl group, the compatibility and phase separation can both be improved.

Figure 2:
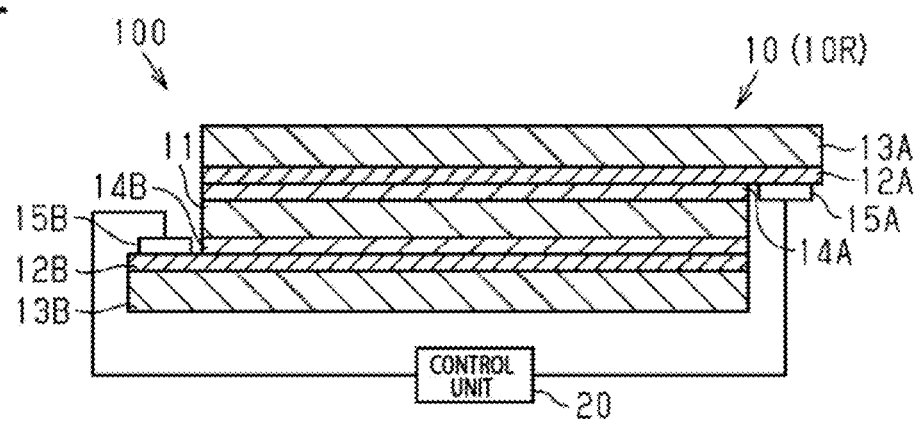
FIG. 2 is a diagram illustrating the configuration of a light control device using a light control sheet, mainly a cross-sectional structure of a reverse-type light control sheet.

Next, referring to FIG. 2, the reverse-type light control sheet 10R will be described. FIG. 2 shows a cross-sectional structure of the light control sheet 10R. The reverse-type light control sheet 10R includes a light control layer 11, transparent electrode layers 12A and 12B, and transparent support layers 13A and 13B, as well as a first orientation layer 14A and a second orientation layer 14B, which are a pair of orientation layers that sandwich the light control layer 11. The first orientation layer 14A is located between the light control layer 11 and the first transparent electrode layer 12A. The second orientation layer 14B is located between the light control layer 11 and the second transparent electrode layer 12B. That is, the first transparent electrode layer 12A and the second transparent electrode layer 12B sandwich the light control layer 11, and also sandwich the orientation layers 14A and 14B.

The orientation layers 14A and 14B are vertical orientation films. When the first transparent electrode layer 12A and the second transparent electrode layer 12B are at equipotential, the orientation layers 14A and 14B orient the liquid crystal compound so that the major axis direction of the liquid crystal compound contained in the light control layer 11 is along the normal direction to the plane extending parallel to the orientation layers 14A and 14B. On the other hand, when a potential difference is generated between the transparent electrode layers 12A and 12B, the orientation layers 14A and 14B can change the major axis direction of the liquid crystal compound contained in the light control layer 11 to a direction other than the above normal direction.

Examples of the materials constituting the orientation layers 14A and 14B include polyesters such as polyamide, polyimide, polycarbonate, polystyrene, polysiloxane, polyethylene terephthalate, and polyethylene naphthalate, and polyacrylates such as polymethyl methacrylate. Examples of the processing to allow the orientation layers 14A and 14B to function as vertical orientation films include rubbing, polarized light irradiation, and microprocessing.

In the normal-type light control sheet 10N, when no drive voltage is applied to the transparent electrode layers 12A and 12B, that is, when the first transparent electrode layer 12A and the second transparent electrode layer 12B are at equipotential, the direction of the major axis direction of the liquid crystal compound contained in the light control layer 11 is irregular. Therefore, light incident on the light control layer 11 is scattered due to the large refractive index difference between the resin composition and the liquid crystal composition, and the light control sheet 10 becomes opaque. On the other hand, when a drive voltage is applied to the transparent electrode layers 12A and 12B, and a potential difference is generated between the first transparent electrode layer 12A and the second transparent electrode layer 12B, the liquid crystal compound is oriented depending on the potential difference, and the major axis direction of the liquid crystal compound becomes parallel to the direction of the electric field between the transparent electrode layers 12A and 12B. As a result, due to the small refractive index difference between the resin composition and the liquid crystal composition, light easily passes through the light control layer 11. As the applied drive voltage increases within a given range, the transparency of the light control sheet 10 increases.

In the reverse-type light control sheet 10R, when no drive voltage is applied to the transparent electrode layers 12A and 12B, the liquid crystal compound is oriented by the orientation layers 14A and 14B, and the major axis direction of the liquid crystal compound is along the normal direction to the plane parallel to the orientation layers 14A and 14B. As a result, the light control sheet 10 becomes transparent due to the small refractive index difference between the resin composition and the liquid crystal composition. On the other hand, when a drive voltage is applied to the transparent electrode layers 12A and 12B, the liquid crystal compound is directed in a direction different from the above normal direction depending on the potential difference between the first transparent electrode layer 12A and the second transparent electrode layer 12B. As a result, due to the large refractive index difference between the resin composition and the liquid crystal composition, light is less likely to pass through the light control layer 11. As the applied drive voltage increases within a given range, the transparency of the light control sheet 10 decreases.

The light control sheet 10 is attached to a transparent member located on the boundary between two spaces, and functions as a partition between the two spaces. The surface to which the light control sheet 10 is attached may be flat or curved. For example, the light control sheet 10 may be attached to building materials, such as glass windows, partitions, and glass walls, or vehicle components, such as automobile glass windows.

Method for Producing Light Control Sheet

A method for producing the light control sheet 10N will be described.

A sheet composed of a first transparent support layer 13A having a first transparent electrode layer 12A on a surface thereof, and a sheet composed of a second transparent support layer 13B having a second transparent electrode layer 12B on a surface thereof are prepared. The first transparent electrode layer 12A and the second transparent electrode layer 12B are formed by a thin film formation method, such as sputtering, vacuum deposition, or coating.

Next, a photosensitive composition is prepared. The photosensitive composition is obtained by mixing and stirring an acrylate represented by the following formula (2), a liquid crystal composition, a polymerization initiator, and other additives. The photosensitive composition may contain pentaerythritol triacrylate or urethane acrylate for the purpose of, for example, enhancing the mechanical strength of the resin composition.

Chemical Formula 2

$$CH_2CHCOO-R^2 \qquad (2)$$

The bridging group represented by $R^2$ is a saturated alkyl group having 1 or more and 12 or fewer carbon atoms. The acrylates include acrylates wherein $R^2$ is a linear alkyl group. In addition to the acrylates wherein $R^2$ is a linear alkyl group, the acrylates may further include at least one selected from a group of acrylates wherein $R^2$ is a cycloalkyl group, acrylates wherein $R^2$ is a bicycloalkyl group, and acrylates wherein $R^2$ is a tricycloalkyl group.

The acrylates wherein $R^2$ is a linear alkyl group are at least one selected from a group of methyl acrylate, ethyl acrylate, propyl acrylate, butyl acrylate, pentyl acrylate, hexyl acrylate, heptyl acrylate, octyl acrylate, nonyl acrylate, decyl acrylate, undecyl acrylate, and dodecyl acrylate.

The acrylates wherein $R^2$ is a cycloalkyl group are at least one selected from a group of cyclopropyl acrylate, cyclobutyl acrylate, cyclopentyl acrylate, cyclohexyl acrylate, cycloheptanyl acrylate, cyclooctyl acrylate, cyclodecanyl acrylate, and cyclododecanyl acrylate.

The acrylates wherein $R^2$ is a bicycloalkyl group are at least one selected from a group of isobornyl acrylate and bicyclo[3.2.1]octylacrylate.

The acrylates wherein $R^2$ is a tricycloalkyl group are at least one selected from a group of dicyclopentanyl acrylate and tricyclo[$5.2.1.0^{2,6}$]decane acrylate.

A dispersion medium with spacers dispersed therein is applied to at least one of the two sheets and heated to remove the solvent and disperse the spacers. Moreover, the photosensitive composition is applied to at least one of the two sheets. The photosensitive composition is applied by a coating method, such as an inkjet method, a gravure coating method, a spin coating method, a slit coating method, a bar coating method, a flexo coating method, a die coating method, a dip coating method, or a roll coating method. Then, one sheet is bonded to the other sheet so that the coating layer of the photosensitive composition is located between the two sheets. The dispersion of the spacers and the dispersion of the photosensitive composition may be carried out as separate steps, or may be carried out as a single step, for example dispersing a photosensitive composition to which spacers are added.

The laminate of the layer formed by applying the photosensitive composition and the sheets that sandwich the coating layer is irradiated with light of a specific wavelength. The light of a specific wavelength promotes the polymerization reaction of the photosensitive composition. The light control layer 11 is thus formed.

The laminate is formed into a large sheet, for example, by using the roll-to-roll method. The laminate is cut out in the desired shape according to the application target of the light control sheet 10N, and a first terminal unit 15A and a second terminal unit 15B are formed for the cut sheet. The light control sheet 10N is thus formed.

According to the above-described embodiment, the advantageous effects listed below can be achieved.

(1) The resin composition that partitions voids filled with a liquid crystal composition contains a repeating structure represented by the above formula (1). Therefore, acrylate is polymerized to form a resin composition, compatibility between a liquid crystal compound having a nematic-isotropic phase transition temperature of 110° C. or greater and 140° C. or less and the acrylate can be obtained. Then, it is possible to promote phase separation to separate the liquid crystal composition from the acrylate polymer throughout the entire resin composition. As a result, the light control sheet 10 can operate normally over a wider temperature range.

(2) Because the resin composition further contains a bicycloalkyl group, which is bulkier than a linear alkyl group, phase separation between the acrylate polymer and the liquid crystal composition can be promoted, while ensuring compatibility between the acrylates and the liquid crystal composition.

(3) The light control sheet 10 can operate normally over a wider temperature range because the haze in the opaque state is 85% or more and the haze in the transparent state is 6.0% or less at a temperature of −30° C. or greater and 100° C. or less.

(4) Because the content of the liquid crystal compound contained in the light control layer 11 is 50 wt %, the light control sheet 10 can operate normally even at low or high temperatures.

Modifications

The above embodiments can be performed with the following modifications.

The control unit 20 may incorporate a temperature sensor for detecting the temperature of the environment in which the light control sheet 10 is used or may be connected to such a temperature sensor. In this aspect, the control unit 20 obtains the temperature detected by the temperature sensor, and when the obtained temperature is, for example, −30° C. or greater and 100° C. or less, a drive voltage may be applied to the light control sheet 10. Further, the control unit 20 may include driving data to associate the temperature of the use environment with the magnitude of driving voltage. Then, the control unit 20 may refer to the driving data and may apply a driving voltage associated with the temperature detected by the temperature sensor to the light control sheet 10.

In addition to the transparent and opaque states, the state of the light control sheet 10 may be switched to a third state in which the light transmittance is intermediate between these states.

The light control sheet 10 may be used in an opaque state as a screen onto which images etc. are projected. The higher the light shielding ratio of the light control sheet 10 in the opaque state, the more clearly images can be projected by suppressing the transmission of light for projection.

EXAMPLES

Figure 3:
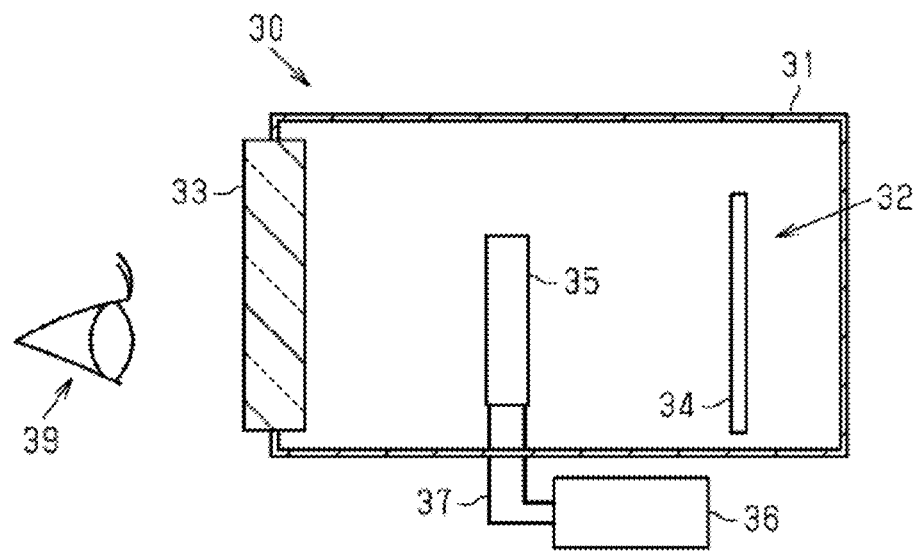
FIG. 3 is a schematic view of a determination device for evaluating the light control sheets of examples and comparative examples.
Figure 4:
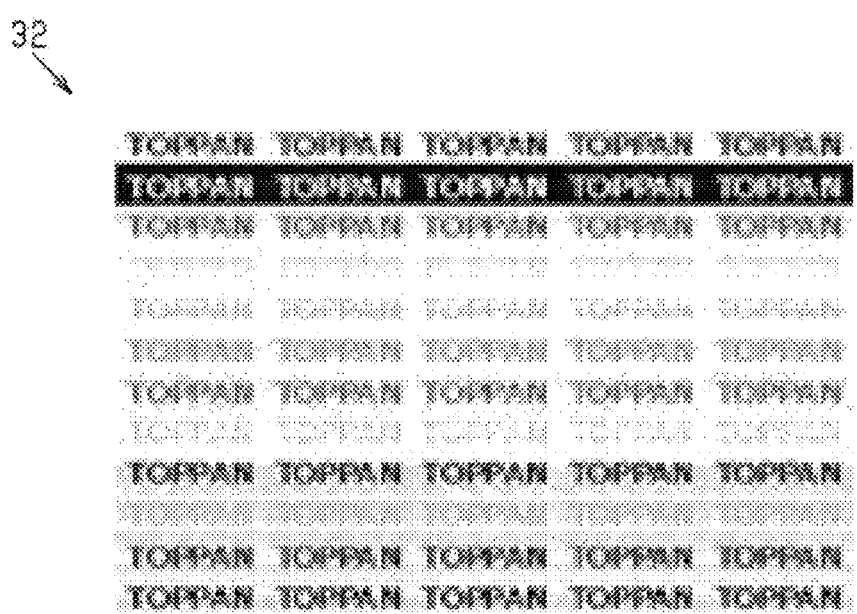
FIG. 4 is a front view of a character board used in the determination device.

Referring to FIG. 3, Examples 1 to 12, which are examples of the above embodiment, and Comparative Examples 1 to 4 will be described in detail. The light control sheet 10 of the present disclosure is not limited to these examples.

The light control sheets of Examples 1 to 12 and Comparative Examples 1 to 4 are of normal type.

Example 1

Methyl acrylate was used as the acrylate for forming the first acrylic polymer contained in the photosensitive composition for forming the light control layer. As the acrylates in the photosensitive composition of Example 1, 16 wt % of methyl acrylate (produced by Tokyo Chemical Industry Co., Ltd.), 11 wt % of pentaerythritol triacrylate (product name: A-TMM-3L, produced by Shin Nakamura Chemical Co., Ltd.), and 21 wt % of urethane acrylate (product name: CN929, produced by Sartomer), relative to the total amount of the photosensitive composition, were added to the photosensitive composition. The acrylate for forming the second acrylic polymer was not added to the photosensitive composition of Example 1. Moreover, as the polymerization initiator in the photosensitive composition of Example 1, a polymerization initiator was added to the photosensitive composition so that the amount of 1-hydroxycyclohexyl phenyl ketone (product name: Irg184, produced by BASF) was 1 wt % relative to the total amount of the photosensitive composition.

Further, as the liquid crystal compound in the photosensitive composition of Example 1, a phenyl-cyclohexyl-based liquid crystal compound having a nematic-isotropic phase transition temperature of 110° C. (MNC-6609, produced by Merck) at 50 wt % relative to the total amount of the photosensitive composition was added to the photosensitive composition. Then, the photosensitive composition of Example 1 was produced as a mixture of the acrylates, the liquid crystal composition, and the polymerization initiator, and a polymethyl methacrylate filler (product name: SSX-115, produced by Sekisui Kasei Co., Ltd., diameter: 15 μm) was used as spacers.

Moreover, a pair of sheets each containing a transparent support layer with a thickness of 125 μm made of polyethylene terephthalate and a transparent electrode layer with a thickness of 30 nm made of indium tin oxide (ITO) were prepared.

The photosensitive composition of Example 1 was applied to one sheet. The other sheet was superimposed on the sheet coated with the photosensitive composition of Example 1, thereby sandwiching the coating layer between two orientation layers. Then, using a high-pressure mercury lamp with an illuminance of 10 mW/cm$^2$, the laminate was irradiated with ultraviolet light through one of the transparent support layers and one of the transparent electrode layers. The polymerization temperature of the photosensitive compound was set to 15° C. or greater and 30° C. or less. The acrylates were thus polymerized and cured to obtain a light control sheet of Example 1 including a resin composition partitioning voids, and a liquid crystal composition filled in the voids.

Example 2

A light control sheet of Example 2 was obtained in the same manner as in Example 1, except that the acrylate for forming the first acrylic polymer was changed to 16 wt % of dodecyl acrylate (produced by Tokyo Chemical Industry Co., Ltd.).

Example 3

The content of methyl acrylate, which was the acrylate for forming the first acrylic polymer, was changed to 11 wt %. Moreover, as the acrylate for forming the second acrylic polymer, 18 wt % of isobornyl acrylate (product name: A-IB, produced by Shin Nakamura Chemical Co., Ltd.) was added to the photosensitive composition. Further, the content of pentaerythritol triacrylate was changed to 6 wt %, and the content of urethane acrylate was changed to 13 wt %. Except for these, a light control sheet of Example 3 was obtained in the same manner as in Example 1.

Example 4

The acrylate for forming the first acrylic polymer was changed to 11 wt % of dodecyl acrylate (same as above). Moreover, as the acrylate for forming the second acrylic polymer, 18 wt % of isobornyl acrylate (product name: A-IB, produced by Shin Nakamura Chemical Co., Ltd.) was added to the photosensitive composition. Further, the content of pentaerythritol triacrylate was changed to 6 wt %, and the content urethane acrylate was changed to 13 wt %. Except for these, a light control sheet of Example 4 was obtained in the same manner as in Example 1.

Examples 5 to 8 below are respectively different from Examples 1 to 4 in terms of the nematic-isotropic phase transition temperature of the liquid crystal compound.

Example 5

A light control sheet of Example 5 was obtained in the same manner as in Example 1, except that the nematic-isotropic phase transition temperature of the liquid crystal compound in Example 1 was changed to 125° C.

Example 6

A light control sheet of Example 6 was obtained in the same manner as in Example 1, except that the nematic-isotropic phase transition temperature of the liquid crystal compound in Example 2 was changed to 125° C.

Example 7

A light control sheet of Example 7 was obtained in the same manner as in Example 1, except that the nematic-isotropic phase transition temperature of the liquid crystal compound in Example 3 was changed to 125° C.

Example 8

A light control sheet of Example 8 was obtained in the same manner as in Example 1, except that the nematic-isotropic phase transition temperature of the liquid crystal compound in Example 4 was changed to 125° C.

Examples 9 to 12 below are respectively different from Examples 1 to 4 in terms of the nematic-isotropic phase transition temperature of the liquid crystal compound.

Example 9

A light control sheet of Example 9 was obtained in the same manner as in Example 1, except that the nematic-isotropic phase transition temperature of the liquid crystal compound in Example 1 was changed to 140° C.

Example 10

A light control sheet of Example 10 was obtained in the same manner as in Example 1, except that the nematic-isotropic phase transition temperature of the liquid crystal compound in Example 2 was changed to 140° C.

Example 11

A light control sheet of Example 11 was obtained in the same manner as in Example 1, except that the nematic-isotropic phase transition temperature of the liquid crystal compound in Example 3 was changed to 140° C.

Example 12

A light control sheet of Example 12 was obtained in the same manner as in Example 1, except that the nematic-isotropic phase transition temperature of the liquid crystal compound in Example 4 was changed to 140° C.

Comparative Examples 1 to 4 below are different from the above examples in terms of the nematic-isotropic phase transition temperature of the liquid crystal compound; the nematic-isotropic phase transition temperature of the liquid crystal compound was changed to be outside the range of 110° C. or greater and 140° C. or less.

Comparative Example 1

A light control sheet of Comparative Example 1 was obtained in the same manner as in Example 3, except that the nematic-isotropic phase transition temperature of the liquid crystal compound was changed to 100° C.

Comparative Example 2

A light control sheet of Comparative Example 2 was obtained in the same manner as in Example 1, except that the nematic-isotropic phase transition temperature of the liquid crystal compound was changed to 100° C., the acrylates for forming the first and second acrylic polymers were not added to the photosensitive composition, the content of pentaerythritol triacrylate was changed to 15 wt %, and the content of urethane acrylate was changed to 33 wt %.

Comparative Example 3

A light control sheet of Comparative Example 3 was obtained in the same manner as in Example 3, except that the nematic-isotropic phase transition temperature of the liquid crystal compound was changed to 150° C.

Comparative Example 4

A light control sheet of Comparative Example 4 was obtained in the same manner as in Example 1, except that the acrylates for forming the first and second acrylic polymers were not added to the photosensitive composition, the content of pentaerythritol triacrylate was changed to 11 wt %, and the content of the urethane acrylate was changed to 21 wt %.

Evaluation Method

For the light control sheets of Examples 1 to 12 and Comparative Examples 1 to 4, changes in the optical characteristics during driving were observed while changing the temperature of the space where the light control sheet was installed within the range of −30° C. or greater and 100° C. or less. The haze measured by a haze meter tends to be affected by temperature. For this reason, a determination device 30 was produced.

FIG. 3 shows a determination device 30 for determining the transparency and opacity of the light control sheet. The determination device 30 includes a housing 31 having a space 32 whose temperature can be adjusted by a heater or the like, a window 33 provided in the housing 31, and a character board 34 positioned inside the space 32. The window 33 is made of glass. The character board 34 displays multiple patterns of predetermined characters with different character colors and character background colors. A sample 35 is located between the window 33 and the character board 34. The character board 34 displays multiple patterns of "TOPPAN" (registered trademark), which is the logo of "Toppan Inc.", with different character colors and character background colors.

Samples 35 were produced from the light control sheets of Examples 1 to 12 and Comparative Examples 1 to 4. In each sample 35, two cuts were made at the corner of one side of the light control sheet and the corner of the opposite side thereof to expose the first transparent electrode layer and the second transparent electrode layer, thereby forming terminal units. Then, the terminal units were joined to the exposed first transparent electrode layer and second transparent electrode layer, and the terminal units were each connected to a control device 36 through different wires 37. The control device 36 is a device that controls the drive voltage applied to the transparent electrode layers.

First, the sample 35 was installed in a position in which an observer 39 could visually observe the sample 35 through the window 33. Further, an AC voltage was applied to the sample 35 from 0 V at a frequency of 50 Hz, and the voltage was increased until the haze of the sample 35 saturated. During transparent driving, the temperature of the space 32 in which the sample 35 was installed was adjusted to −30° C., and that temperature was maintained. Then, while visually observing the sample 35, the observer waited until the haze increased and saturated while no drive voltage was applied to the transparent electrode layers of the sample 35. When the haze saturated, it was determined whether the characters displayed on the character board 34 were legible through the sample 35, and the haze of the sample 35 during opaque driving was evaluated.

As shown in FIG. 5, the clarity of characters viewed through each sample 35 was classified as one of "level 0" to "level 5". In this case, the state in which the sample 35 was completely transparent and the characters on the character board 34 were clearly legible was classified as "level 0", the state in which the sample 35 was slightly turbid but the characters were clearly legible was classified as "level 1", the state in which 50% or more and less than 100% of the characters were legible was classified as "level 2", the state in which more than 0% and less than 50% of the characters were legible was classified as "level 3", the state in which although the entire characters were not legible, the outline of the characters was identifiable was classified as "level 4", and the opaque state in which no characters were legible was classified as "level 5".

In the evaluation of the opaque state, examples in which the states of "level 0" to "level 3" were maintained were judged as "poor." Further, in the evaluation of the opaque state, examples in which the state of "level 4" was maintained were judged as "fair." Moreover, in the evaluation of the opaque state, examples in which the state of "level 5" was maintained were judged as "good," and examples in which particularly high haze was maintained were judged as "excellent." Similarly, from the state of turning off the drive voltage, the drive voltage was applied to reduce the haze, and the observer waited until the haze stabilized. When the haze stabilized, it was determined whether the characters displayed on the character board 34 were legible through the sample 35, and the haze of the sample 35 during transparent driving was evaluated.

As shown in FIG. 5, in the evaluation of the transparent state, examples in which the transparent states of "level 2" to "level 5" were maintained were judged as "poor." Further, in the evaluation of the transparent state, examples in which the transparent state of "level 1" was maintained were judged as "fair," examples in which the transparent state of "level 0" was maintained were judged as "good," and examples in which particularly high transparency and low haze were maintained were judged as "excellent."

After evaluating the opaque and transparent states at −30° C., the temperature was adjusted step by step in the order of −20° C., 0° C., 23° C., 90° C., and 100° C. Each time the temperature was adjusted, the drive voltage was turned off to provide transparent driving, then the drive voltage was applied, and the state during opaque driving was evaluated when the haze had stabilized. In addition, after the drive voltage was applied and the haze stabilized, the drive voltage was turned off, and the state during transparent driving was evaluated when the haze had stabilized.

Using a temperature of 23° C. as a reference, the haze from "level 0" to "level 5" was measured using a haze meter (NDH-7000SP, produced by Suga Test Instruments Co., Ltd.). As a result, the haze was 97% or more at the level of "excellent," the haze was 90% or more and less than 97% at the level of "good," the haze was 85% or more and less than 90% at the level of "fair," and the haze was less than 85% at the level of "poor." In the transparent state, the haze was 5.0% or less at the level of "excellent," the haze was 5.0% or more and less than 5.5% at the level of "good," the haze was 5.5% or more and less than 6.0% at the level of "fair," and the haze was 6.0% or more at the level of "poor."

Evaluation

FIG. 6 shows the evaluation results of Examples 1 to 12 and Comparative Examples 1 to 4. In the light control sheets of Examples 1 and 2, the transparent state during transparent driving was at the level of "good" at low to normal temperatures of −30° C. to 23° C. during driving. Moreover, the opaque state during opaque driving was at the level of "fair" at high temperatures of 90° C. to 100° C., confirming that sufficient haze was obtained as the opaque state.

In addition, in the light control sheets of Examples 1 and 2, the transparent state during transparent driving was at the level of "good" at low to high temperatures of −30° C. to 100° C. during driving, confirming that the haze was low as the transparent state.

Therefore, it was confirmed that for the light control sheets of Examples 1 and 2, good and stable haze in the opaque state and good and stable haze in the transparent state, as well as good contrast were obtained in a wide temperature range of −30° C. to 100° C.

In the light control sheets of Examples 3 and 4, which contained isobornyl acrylate, the opaque state during opaque driving was at the level of "excellent" at low to normal temperatures of −30° C. to 23° C. during driving, confirming that higher haze was obtained than in Examples 1 and 2. Moreover, the opaque state during opaque driving was at the level of "good" at high temperatures of 90° C. to 100° C., confirming that sufficient haze was obtained as the opaque state.

In addition, in the light control sheets of Examples 3 and 4, the transparent state during transparent driving was at the level of "good" at low to high temperatures of −30° C. to 100° C. during driving, confirming that the haze was low as the transparent state.

Therefore, it was confirmed that for the light control sheets of Examples 3 and 4, good and stable haze in the opaque state and good and stable haze in the transparent state, as well as good contrast were obtained in a wide temperature range of −30° C. to 100° C.

In the light control sheets of Examples 5 and 6, the opaque state during opaque driving was at the level of "good" at low to normal temperatures of −30° C. to 23° C. during driving, confirming that high haze was obtained. Moreover, the opaque state during opaque driving was at the level of "fair" at high temperatures of 90° C. to 100° C., confirming that sufficient haze was obtained as the opaque state.

In addition, in the light control sheets of Examples 5 and 6, the transparent state was at the level of "fair" at a low temperature of −30° C. The transparent state during transparent driving was at the level of "good" at low to high temperatures of −20° C. to 100° C. during driving, confirming that the haze was low as the transparent state.

Therefore, it was confirmed that for the light control sheets of Examples 5 and 6, good and stable haze in the opaque state and good and stable haze in the transparent state, as well as good contrast were obtained in a wide temperature range of −30° C. to 100° C.

In the light control sheets of Examples 7 and 8, which contained isobornyl acrylate, the opaque state during opaque driving was at the level of "excellent" at low to normal temperatures of −30° C. to 23° C., and higher haze was obtained than in Examples 1, 2, 5 and 6. Moreover, the opaque state during opaque driving was at the level of "good" at high temperatures of 90° C. to 100° C., confirming that sufficient haze was obtained as the opaque state.

In addition, in the light control sheets of Examples 7 and 8, the transparent state was at the level of "fair" at a low temperature of −30° C.; however, the transparent state during transparent driving was at the level of "good" at low to high temperatures of −20° C. to 100° C. during driving, confirming that the haze was low as the transparent state.

Therefore, it was confirmed that for the light control sheets of Examples 7 and 8, good and stable haze in the opaque state and good and stable haze in the transparent state, as well as good contrast were obtained in a wide temperature range of −30° C. to 100° C.

In the light control sheets of Examples 9 and 10, the opaque state during opaque driving was at the level of "good" at low to high temperatures of −30° C. to 90° C., confirming that the haze was high. Moreover, the opaque state during opaque driving was at the level of "fair" at a high temperature of 100° C., confirming that sufficient haze was obtained as the opaque state.

In addition, in the light control sheets of Examples 9 and 10, the transparent state during transparent driving was at the level of "fair" at a low temperature of −30° C. to −20° C. during driving. Moreover, the transparent state during transparent driving was at the level of "good" at high temperatures of 90° C. to 100° C., confirming that the haze was low as the transparent state.

Therefore, it was confirmed that for the light control sheets of Examples 9 and 10, good and stable haze in the opaque state and good and stable haze in the transparent state, as well as good contrast were obtained in a wide temperature range of −30° C. to 100° C. Moreover, compared with Examples 5 and 6, in which the nematic-isotropic phase transition temperature was 125° C., the haze in the opaque state at 90° C. was further increased, and the haze in the transparent state at −20° C. was slightly higher.

In the light control sheets of Examples 11 and 12, which contained isobornyl acrylate, the opaque state during opaque driving was at the level of "excellent" at low to normal temperatures of −30° C. to 23° C., confirming high haze. Moreover, the opaque state during opaque driving was at the level of "good" at high temperatures of 90° C. to 100° C., confirming that sufficient haze was obtained as the opaque state.

In addition, in the light control sheets of Examples 11 and 12, the transparent state was at the level of "fair" at low temperatures of −30° C. to −20° C. The transparent state during transparent driving was at the level of "good" at low to high temperatures of 0° C. to 100° C., confirming that the haze was low as the transparent state.

Therefore, it was confirmed that for the light control sheets of Examples 11 and 12, good and stable haze in the opaque state and good and stable haze in the transparent state, as well as good contrast were obtained in a wide temperature range of −30° C. to 100° C.

In the light control sheet of Comparative Example 1, the opaque state during opaque driving was at the level of "excellent" at low to normal temperatures of −30° C. to 23° C. during driving. Moreover, the haze in the opaque state was at the level of "fair" at 90° C. Even though the state temporarily became opaque at 100° C., the state did not gradually change to transparent; thus, it was evaluated as the level of "poor." The reason for this is thought as follows. Specifically, when the temperature of the space 32 reaches 100° C., the temperature of the environment becomes equal to or higher than the nematic-isotropic phase transition temperatures of the liquid crystal compounds of Comparative Examples 1 and 2, and transition occurs from the liquid crystal phase to the isotropic liquid phase.

In addition, in the light control sheet of Comparative Example 1, the transparent state during transparent driving was at the level of "excellent" at low to normal temperatures of −30° C. to 23° C. during driving, the haze in the transparent state at 90° C. was at the level of "fair," and the haze in the transparent state at 100° C. was at the level of "poor." The reason for this is thought to be that the liquid crystal compound has undergone phase transition to the liquid phase in a temperature environment of 100° C., as described above.

In the light control sheet of Comparative Example 2, since the resin composition did not have the first acrylic polymer and second acrylic polymer, the compatibility between the acrylates and the liquid crystal composition in the resin composition was low, and the photosensitive composition was turbid. For this reason, it was evaluated that haze control was impossible.

In the light control sheet of Comparative Example 3, the opaque state during opaque driving was at the level of "excellent" at low to normal temperatures of −30° C. to 23° C. during driving. The haze in an opaque state was at the level of "good" at high temperatures of 90° C. to 100° C.

In addition, in the light control sheet of Comparative Example 3, the transparent state during transparent driving was at the level of "poor" at low temperatures of −30° C. to −20° C. during driving. The reason for this is thought as follows. Specifically, when the nematic-isotropic phase transition temperature exceeds 150° C., the viscosity rises in a state where the liquid crystal compound is close to the smectic phase in an extremely low-temperature environment such as below zero, and the orientation state is less likely to change.

As with the light control sheet of Comparative Example 2, in the light control sheet of Comparative Example 4, the compatibility between the resin composition and the liquid crystal composition was low, and the photosensitive composition was turbid. For this reason, it was evaluated that haze control was impossible.

A light control sheet includes a light control layer containing a resin composition and a liquid crystal composition, and a pair of transparent electrode layers that sandwich the light control layer (see, for example, JP 2017-187775 A). A light control device includes the above light control sheet, and a driving unit that applies a drive voltage to the transparent electrode layers. The orientation state of liquid crystal molecules changes depending on the potential difference between the two transparent electrode layers, whereby the light transmittance of the light control sheet changes.

The light control sheet may be attached to, for example, building materials, such as glass windows and glass walls, automobile glass windows, or the like. Therefore, the light control sheet is exposed to harsh temperature environments. However, in a conventional light control sheet, the viscosity of the light control layer becomes too high or too low due to temperature changes. As a result, even when the driving unit applies a drive voltage, the light control sheet may not have the required haze.

A light control sheet according to an embodiment of the present invention is a liquid crystal-dispersed light control sheet including: a light control layer containing a resin composition that partitions voids, and a liquid crystal composition filled in the voids; a pair of transparent electrode layers that sandwich the light control layer; and a pair of transparent support layers that sandwich the pair of transparent electrode layers. The liquid crystal composition includes a liquid crystal compound having a nematic-isotropic phase transition temperature of 110° C. or greater and 140° C. or less, and the resin composition includes an acrylic polymer containing a repeating structure represented by the following formula (1), Chemical Formula 1

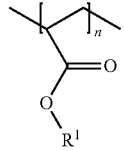

(1)

where $R^1$ is a saturated alkyl group having 1 or more and 12 or fewer carbon atoms, and the resin composition including, in the acrylic polymer, a moiety in which the saturated alkyl group is a linear alkyl group.

A light control device according to an embodiment of the present invention includes: the light control sheet; and a control unit that controls application of a drive voltage to the transparent electrode layers.

With each of the above configurations, the resin composition that partitions voids filled with a liquid crystal composition contains a repeating structure represented by the formula (1). Therefore, acrylate is polymerized to form a resin composition, compatibility between a liquid crystal compound having a nematic-isotropic phase transition temperature of 110° C. or greater and 140° C. or less and the acrylate can be obtained. Then, the acrylate polymer and the liquid crystal compound can be phase-separated throughout the entire resin composition. As a result, the light control sheet can operate normally over a wider temperature range.

In the light control sheet, the resin composition may contain a bicycloalkyl group as the saturated alkyl group. Further, in the light control sheet, the bicycloalkyl group may contain an isobornyl group.

With each of the above configurations, the acrylate contains a bicycloalkyl group that is bulkier than a linear alkyl group. Therefore, phase separation between the acrylate polymer and the liquid crystal compound is promoted, while ensuring compatibility between the acrylate and the liquid crystal composition.

In the light control sheet, the haze in an opaque state may be 85% or more and the haze in a transparent state may be 6.0% or less at a temperature of −30° C. or greater and 100° C. or less.

With the above configuration, the light control sheet can operate normally over a wider temperature range.

In the light control sheet, the content of the liquid crystal compound contained in the light control layer may be 50 wt %.

With the above configuration, the content of the liquid crystal compound contained in the light control layer is sufficient, and the light control sheet can operate normally even at low or high temperatures.

A photosensitive composition for producing a liquid crystal-dispersed light control layer according to an embodiment of the present invention includes: an acrylate mixture and a liquid crystal composition. The liquid crystal composition includes a liquid crystal compound having a nematic-isotropic phase transition temperature of 110° C. or greater and 140° C. or less, and the acrylate mixture includes pentaerythritol triacrylate, urethane acrylate, and an acrylate represented by the following formula (2), Chemical Formula 2

$$CH_2CHCOO—R^2 \quad (2)$$

where $R^2$ is a saturated alkyl group having 1 or more and 12 or fewer carbon atoms, and the acrylate mixture including an acrylate in which the saturated alkyl group is a linear alkyl group and an acrylate in which the saturated alkyl group is a bicycloalkyl group.

A method for producing a liquid crystal-dispersed light control sheet according to an embodiment of the present invention includes: applying a photosensitive composition including an acrylate mixture and a liquid crystal composition to a transparent support layer of a laminate including a transparent electrode layer and the transparent support layer; and applying light of a specific wavelength to the laminate coated with the photosensitive composition and another laminate that are superimposed such that the photosensitive composition is formed between the laminates to cure the acrylate mixture. The liquid crystal composition includes a liquid crystal compound having a nematic-isotropic phase transition temperature of 110° C. or greater and 140° C. or less, and the acrylate mixture includes pentaerythritol triacrylate, urethane acrylate, and an acrylate represented by the following formula (2), Chemical Formula 2

$$CH_2CHCOO—R^2 \quad (2)$$

where $R^2$ is a saturated alkyl group having 1 or more and 12 or fewer carbon atoms, and the acrylate mixture including an acrylate in which the saturated alkyl group is a linear alkyl group and an acrylate in which the saturated alkyl group is a bicycloalkyl group.

With each of the above configurations, compatibility between the liquid crystal compound having a nematic-isotropic phase transition temperature of 110° C. or greater and 140° C. or less and the acrylate mixture is obtained, and phase separation between the acrylate mixture containing a bicycloalkyl group and the liquid crystal compound is promoted; thus, the acrylate polymer and the liquid crystal compound can be phase-separated throughout the entire resin composition. As a result, the light control sheet can operate normally over a wider temperature range.

A light control device according to an embodiment of the present invention operates normally over a wider temperature range.

Obviously, numerous modifications and variations of the present invention are possible in light of the above teachings. It is therefore to be understood that within the scope of the appended claims, the invention may be practiced otherwise than as specifically described herein.

The invention claimed is:

1. A liquid crystal-dispersed light control sheet, comprising:
    a light control layer;
    a pair of transparent electrode layers sandwiching the light control layer; and
    a pair of transparent support layers sandwiching the pair of transparent electrode layers,
    wherein the light control layer includes a resin composition partitioning a plurality of voids, and a liquid crystal composition filling the voids, the liquid crystal composition includes a liquid crystal compound having a nematic-isotropic phase transition temperature in a range of 110° C. to 140° C., and the resin composition includes an acrylic polymer comprising a repeating structure of

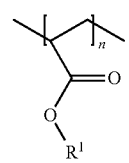

Formula (1)

where $R^1$ is a linear alkyl group having 1 to 12 carbon atoms, and n is an integer of 2 or more.

2. The light control sheet according to claim 1, wherein the acrylic polymer of the resin composition includes a second repeating structure of formula (1),

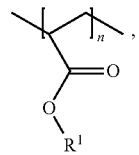

where $R^1$ is a bicycloalkyl group, and n is an integer of 2 or more.

3. The light control sheet according to claim 2, wherein the bicycloalkyl group includes an isobornyl group.

4. The light control sheet according to claim 1, wherein the light control sheet has a haze in an opaque state of 85% or more and a haze in a transparent state of 6.0% or less at a temperature in a range of −30° C. to 100° C.

5. The light control sheet according to claim 1, wherein a content of the liquid crystal compound in the light control layer is 50 wt % or more.

6. A light control device, comprising:
    the light control sheet of claim 1; and
    a control unit comprising circuitry configured to control application of a drive voltage to the transparent electrode layers.

7. The light control sheet according to claim 2, wherein the light control sheet has a haze in an opaque state of 85% or more and a haze in a transparent state of 6.0% or less at a temperature in a range of −30° C. to 100° C.

8. The light control sheet according to claim 2, wherein a content of the liquid crystal compound in the light control layer is 50 wt % or more.

9. A light control device, comprising:
    the light control sheet of claim 2; and
    a control unit comprising circuitry configured to control application of a drive voltage to the transparent electrode layers.

10. The light control sheet according to claim 3, wherein the light control sheet has a haze in an opaque state of 85% or more and a haze in a transparent state of 6.0% or less at a temperature in a range of −30° C. to 100° C.

11. The light control sheet according to claim 3, wherein a content of the liquid crystal compound in the light control layer is 50 wt % or more.

12. A light control device, comprising:
    the light control sheet of claim 3; and a control unit comprising circuitry configured to control application of a drive voltage to the transparent electrode layers.

13. The light control sheet according to claim 4, wherein a content of the liquid crystal compound in the light control layer is 50 wt % or more.

14. A light control device, comprising:
the light control sheet of claim 4; and
a control unit comprising circuitry configured to control application of a drive voltage to the transparent electrode layers.

15. A light control device, comprising:
the light control sheet of claim 5; and
a control unit comprising circuitry configured to control application of a drive voltage to the transparent electrode layers.

16. The light control sheet according to claim 7, wherein a content of the liquid crystal compound in the light control layer is 50 wt % or more.

17. A light control device, comprising:
the light control sheet of claim 7; and
a control unit comprising circuitry configured to control application of a drive voltage to the transparent electrode layers.

18. The light control sheet according to claim 10, wherein a content of the liquid crystal compound in the light control layer is 50 wt % or more.

19. The light control sheet according to claim 1, wherein the acrylic polymer of the resin composition includes the repeating structure of formula (1), where the n in the formula (1) is in a range of 2 to 500.

20. The light control sheet according to claim 2, wherein the acrylic polymer of the resin composition includes the repeating structure of formula (1), where the n in the formula (1) is in a range of 2 to 500.

* * * * *